United States Patent
Morin et al.

(10) Patent No.: US 9,091,489 B2
(45) Date of Patent: Jul. 28, 2015

(54) RADIATOR SYSTEMS

(75) Inventors: Thomas William Morin, Vail, AZ (US); Taber K. MacCallum, Tucson, AZ (US); Norman Jacob Hahn, Evergreen, CO (US); John Zaniel Maccagnano, Tucson, AZ (US)

(73) Assignee: PARAGON SPACE DEVELOPMENT CORPORATION, Tuscon, AZ (US)

( * ) Notice: Subject to any disclaimer, the term of this patent is extended or adjusted under 35 U.S.C. 154(b) by 914 days.

(21) Appl. No.: 13/107,620

(22) Filed: May 13, 2011

(65) Prior Publication Data

US 2011/0277959 A1    Nov. 17, 2011

Related U.S. Application Data

(60) Provisional application No. 61/334,733, filed on May 14, 2010, provisional application No. 61/423,927, filed on Dec. 16, 2010.

(51) Int. Cl.
*F24D 3/14* (2006.01)
*F28D 15/00* (2006.01)
(Continued)

(52) U.S. Cl.
CPC ............ *F28D 15/00* (2013.01); *B64G 1/503* (2013.01); *F28D 1/053* (2013.01); *F28F 1/22* (2013.01); *F28D 2021/0031* (2013.01)

(58) Field of Classification Search
CPC ............ F24D 3/14; F24D 3/12; F24D 3/00; F24D 3/02; F24D 3/127; F24D 19/0003; F24D 19/0213; F24D 19/0236; F24D 1/00; F24D 11/003; F28D 1/02; F28D 1/22; F28D 2021/0092; F28F 1/14; F28F 2275/06; B60H 1/246; B60H 2001/00221; B64G 1/56; B64G 1/506; B64G 1/50; B64D 13/00
USPC ............ 237/69, 70, 71, 43, 59; 244/171.7, 244/171.8, 158.1, 118.5, 117 R
IPC ............ F24D 3/14,3/12, 3/02; F28F 1/16, F28F 1/20, 1/24, 1/26, 1/30; B64G 1/56, B64G 1/50; B64D 13/00
See application file for complete search history.

(56) References Cited

U.S. PATENT DOCUMENTS 2,184,113 A * 12/1939 Calafati ........................ 165/56
2,483,721 A * 10/1949 Becker ........................ 237/43
(Continued)

FOREIGN PATENT DOCUMENTS

DE    3521378 A1 * 12/1986    ............ F28F 1/20
EP    780303 A1 *  6/1997    ............ B64G 1/50
(Continued)

OTHER PUBLICATIONS

Friction Stir Welding at TWI; http://materialteknologi.hig.no/Lettvektdesign/joining%20methods/joining-welding-friction%20stir%20weld.htm.
(Continued)

*Primary Examiner* — Steven B McAllister
*Assistant Examiner* — Daniel E Namay
(74) *Attorney, Agent, or Firm* — Weaver Austin Villeneuve & Sampson LLP

(57) ABSTRACT

A system of spacecraft radiators comprising pre-formed thermal-transfer modules joined together by at least one solid-state welding process. Critical failure points are eliminated by forming the thermal-transfer modules as a single unitary piece, preferably by an extrusion process. The thermal-transfer modules allow the formation of larger radiator assemblies, which may comprise a wide range of sizes and physical geometries.

26 Claims, 9 Drawing Sheets

(51) Int. Cl.
*B64G 1/50* (2006.01)
*F28D 1/053* (2006.01)
*F28F 1/22* (2006.01)
*F28F 1/20* (2006.01)
*F28D 21/00* (2006.01)

(56) References Cited

U.S. PATENT DOCUMENTS

| | | | | |
|---|---|---|---|---|
| 2,799,481 | A * | 7/1957 | Becker | 165/171 |
| 3,037,746 | A * | 6/1962 | Williams | 165/56 |
| 4,326,583 | A * | 4/1982 | Rudd | 165/183 |
| 4,420,035 | A | 12/1983 | Hewitt | |
| 4,508,162 | A * | 4/1985 | Radtke | 165/56 |
| 4,687,048 | A | 8/1987 | Edelstein et al. | |
| 4,706,740 | A * | 11/1987 | Mahefkey | 165/104.14 |
| 4,830,097 | A * | 5/1989 | Tanzer | 165/41 |
| 4,832,113 | A * | 5/1989 | Mims et al. | 165/41 |
| 4,865,120 | A * | 9/1989 | Shiroki | 165/56 |
| 4,880,050 | A | 11/1989 | Nakamura et al. | |
| 5,078,203 | A * | 1/1992 | Shiroki | 165/56 |
| 5,117,901 | A | 6/1992 | Cullimore | 165/86 |
| 5,211,360 | A * | 5/1993 | Zimbelman | 244/164 |
| 5,351,746 | A * | 10/1994 | Mackey et al. | 165/41 |
| 5,372,183 | A * | 12/1994 | Strickberger | 165/41 |
| 5,383,517 | A | 1/1995 | Dierbeck | |
| 5,454,428 | A * | 10/1995 | Pickard et al. | 165/49 |
| 5,460,317 | A | 10/1995 | Thomas et al. | |
| 5,788,152 | A * | 8/1998 | Alsberg | 237/69 |
| 5,813,592 | A | 9/1998 | Midling et al. | |
| 5,823,477 | A | 10/1998 | York | |
| 6,073,407 | A * | 6/2000 | Sokolean | 52/302.1 |
| 6,095,235 | A * | 8/2000 | Kongsgaard | 165/56 |
| 6,230,790 | B1 | 5/2001 | Hemingway et al. | 165/80.4 |
| 6,273,323 | B1 | 8/2001 | Ezumi et al. | |
| 6,283,382 | B1 * | 9/2001 | Fitzemeyer | 237/69 |
| 6,626,231 | B2 * | 9/2003 | Cluzet et al. | 165/41 |
| 6,637,109 | B2 | 10/2003 | Nyqvist | |
| 6,854,510 | B2 * | 2/2005 | Low et al. | 165/41 |
| 6,923,362 | B2 | 8/2005 | Mishra | |
| 7,354,657 | B2 | 4/2008 | Mishra | |
| 7,802,716 | B2 | 9/2010 | Nishikawa et al. | |
| 7,992,623 | B2 * | 8/2011 | Keller | 165/53 |
| 8,025,240 | B2 * | 9/2011 | Keller | 237/69 |
| 8,308,111 | B2 * | 11/2012 | Lu et al. | 244/172.7 |
| 2002/0145082 | A1 * | 10/2002 | Bertheux et al. | 244/163 |
| 2003/0196778 | A1 | 10/2003 | Kobayashi et al. | |
| 2004/0026525 | A1 * | 2/2004 | Fiedrich | 237/69 |
| 2004/0031885 | A1 * | 2/2004 | D'Ausilio et al. | 244/172 |
| 2005/0056403 | A1 | 3/2005 | Norlin et al. | |
| 2005/0116012 | A1 * | 6/2005 | Packer et al. | 228/112.1 |
| 2005/0194122 | A1 * | 9/2005 | Wert | 165/104.21 |
| 2006/0027628 | A1 * | 2/2006 | Sutherlin et al. | 228/101 |
| 2006/0201654 | A1 * | 9/2006 | Wert | 165/104.21 |
| 2007/0138237 | A1 | 6/2007 | Nishikawa et al. | |
| 2008/0000435 | A1 | 1/2008 | Baer et al. | |
| 2008/0217483 | A1 * | 9/2008 | Hugon et al. | 244/171.8 |
| 2009/0014497 | A1 * | 1/2009 | Ryu | 228/2.3 |
| 2009/0050302 | A1 | 2/2009 | Husges et al. | |
| 2009/0052876 | A1 * | 2/2009 | MacDuff et al. | 392/437 |
| 2009/0114373 | A1 | 5/2009 | Sawaguchi et al. | |
| 2009/0308570 | A1 | 12/2009 | Wadsworth et al. | |
| 2009/0308582 | A1 | 12/2009 | Nagurny et al. | |
| 2009/0314848 | A1 * | 12/2009 | Andersson | 237/71 |
| 2010/0064717 | A1 | 3/2010 | Burn | |
| 2010/0181054 | A1 | 7/2010 | Nagurny et al. | |
| 2010/0237157 | A1 * | 9/2010 | Guo | 237/69 |
| 2010/0243817 | A1 * | 9/2010 | McKinnon et al. | 244/171.8 |

FOREIGN PATENT DOCUMENTS

| | | | | |
|---|---|---|---|---|
| EP | 780304 A1 * | 6/1997 | | B64G 1/50 |
| EP | 780306 A1 * | 6/1997 | | B64G 1/64 |
| EP | 786404 A1 * | 7/1997 | | B64G 1/50 |
| EP | 822139 A1 * | 2/1998 | | B64G 1/50 |
| EP | 1468911 A1 * | 10/2004 | | B64G 1/50 |
| EP | 1961659 A1 * | 8/2008 | | B64G 1/50 |
| JP | 03175218 A * | 7/1991 | | F24D 3/16 |
| WO | WO 2010111364 A1 * | 9/2010 | | B64G 1/50 |

OTHER PUBLICATIONS

"*Orbiter Active Thermal Control Subsystem Description and Test History*", Crew Systems Division, NASA—Manned Spacecraft Center, 124 pages.

Morton, et al., "*S1-3 Heat Rejection Subsystem Radiator (HRSR) Panel #7 Face Sheet Separation Anomaly—PRACA 4145/Part 7203—Failure Investigation Closure Plan*", 72 pages.

Oren, et al., "*Space Station Heat Rejection Subsystem Radiator Assembly Design and Development*", SAE Technical Paper Series, 12 pages.

* cited by examiner

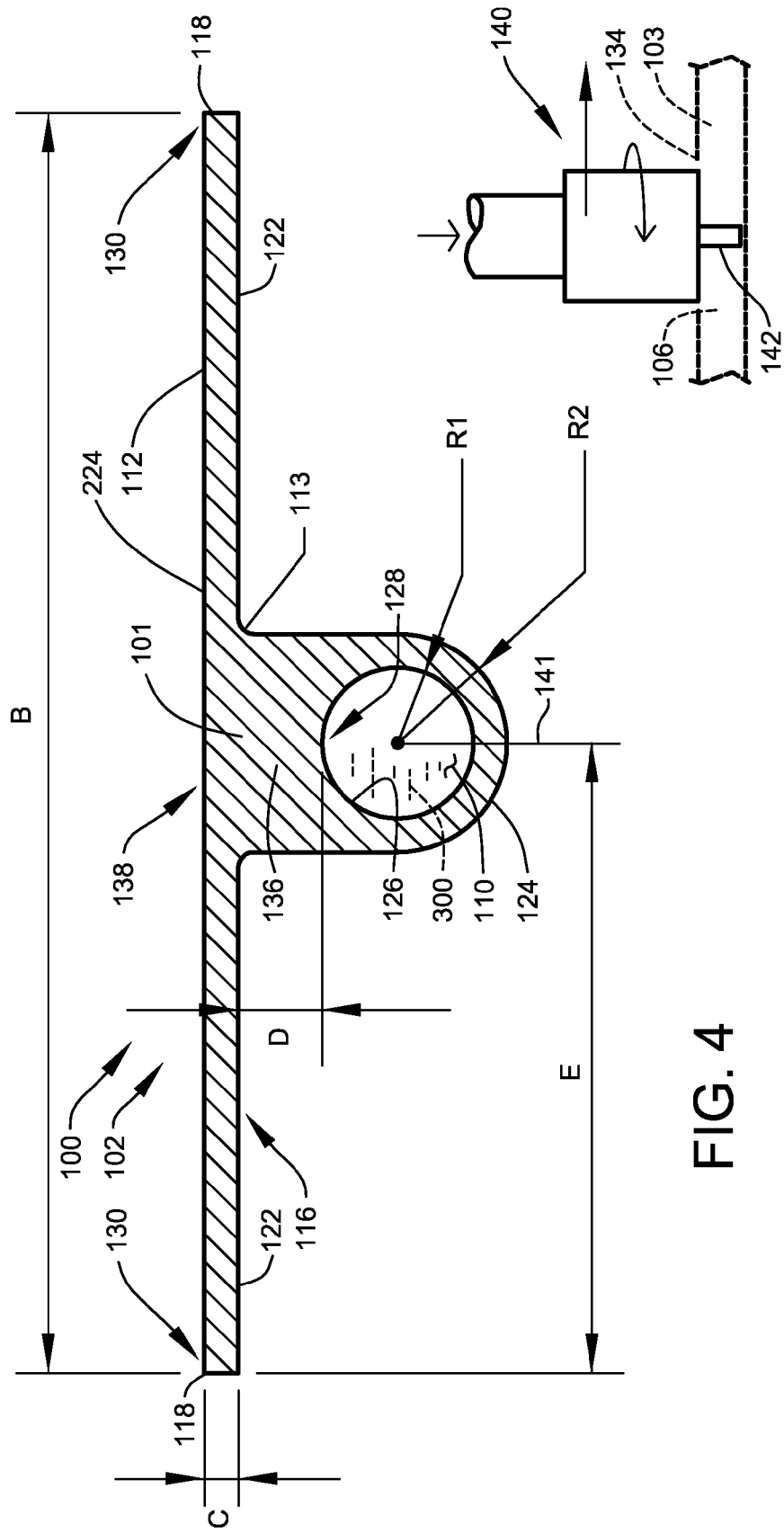

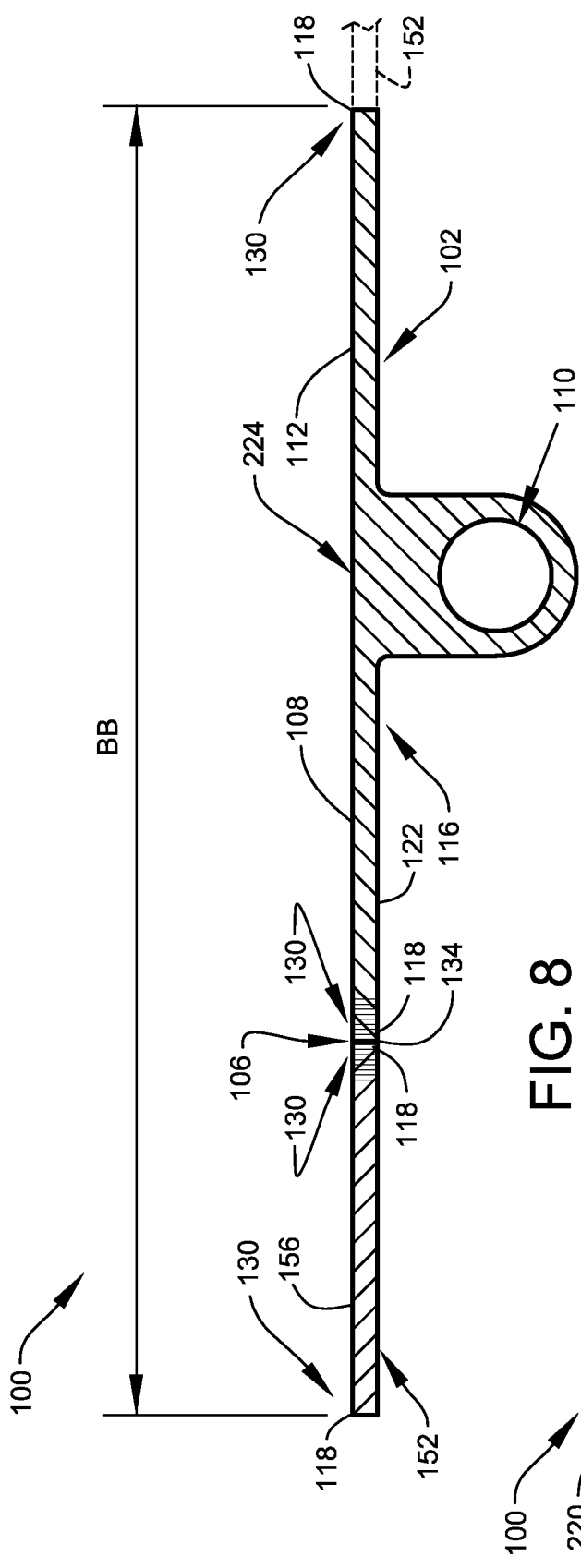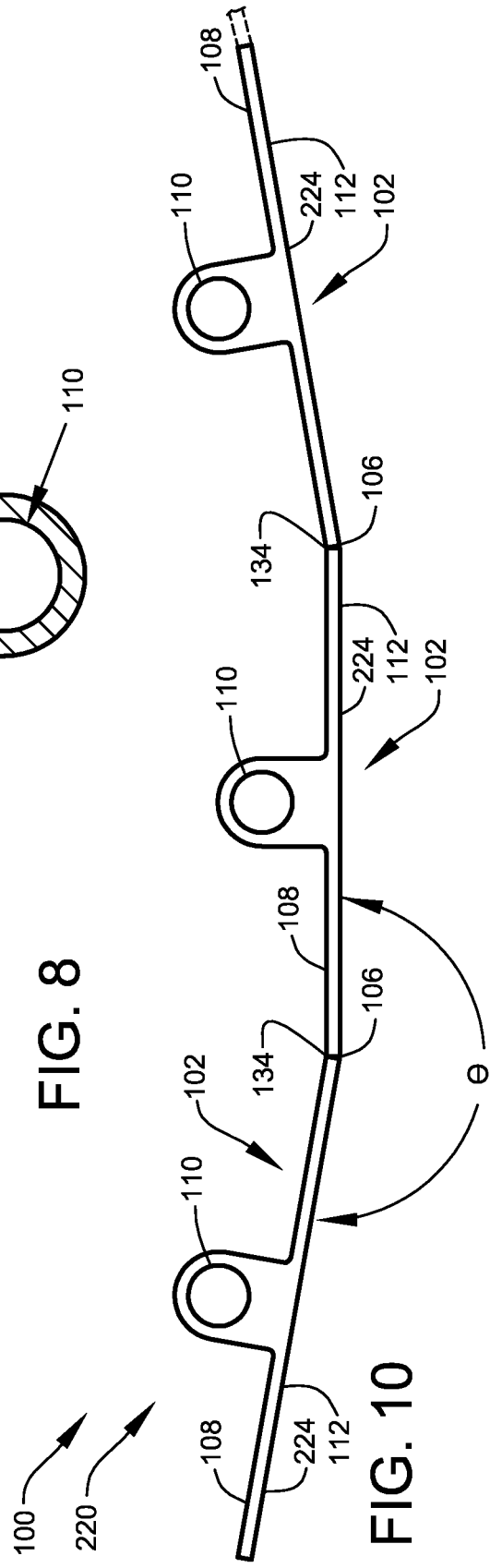

RADIATOR SYSTEMS

CROSS-REFERENCE TO RELATED APPLICATION

The present application is related to and claims priority from prior provisional application Ser. No. 61/334,733, filed May 14, 2010, entitled "NOVEL METHOD OF MANUFACTURING OF RADIATOR SYSTEMS"; and, this application is related to and claims priority from prior provisional application Ser. No. 61/423,927, filed Dec. 16, 2010, entitled "NOVEL METHOD OF MANUFACTURING OF RADIATOR SYSTEMS", the contents of both of which are incorporated herein by this reference and are not admitted to be prior art with respect to the present invention by the mention in this cross-reference section.

BACKGROUND

This invention relates to improved radiator systems and novel methods of manufacturing such apparatus. More particularly, this invention relates to radiator assemblies utilizing extrusion-formed modules that may be combined.

Thermal control is an important aspect of spacecraft design and operation. A principal objective of a spacecraft thermal-control subsystem is to maintain internal and external components within temperature ranges appropriate to their operation. Thermal control in spacecraft generally involves the collection, transfer, and rejection of waste heat from the onboard heat loads to the surrounding space environment. In the vacuum environment of space, the primary heat rejection mechanism is radiation.

Radiators and similar heat-rejection devices generally operate by transferring heat from a fluid to a surface for radiation away from the fluid. In conventional spacecraft designs, a thermal-control subsystem may transfer waste heat to external radiator surfaces where the heat is radiated to the surrounding space environment.

Operational safety and reliability are of prime importance in most spacecraft apparatus due to the often critical functions they support. Radiators operated in a space environment are often subjected to extreme thermal cycling, which poses heavy structural demands on the radiator subcomponents including the bonds formed between fluid tubes and thermal-surface components. In addition, it is important that radiators and similar heat-rejection devices address other risk factors including damage by micrometeoroid and orbital debris (MMOD) impacts.

OBJECTS AND FEATURES OF THE INVENTION

A primary object and feature of the present invention is to provide a system overcoming the above-mentioned problems.

It is a further object and feature of the present invention to provide such a system including methods for manufacturing radiators by joining pre-formed thermal-transfer modules using at least one solid-state welding process. It is another object and feature of the present invention to provide embodiments of such system that eliminate critical failure points by forming the modules as a single unitary piece, preferably by an extrusion-forming process. It is another object and feature of the present invention to configure such thermal-transfer modules to allow the formation of larger heat-rejection assemblies, preferably including radiators and heat exchangers, preferably comprising an extensive range of sizes and physical geometries, with scalable heat-rejection capacities ranging between several hundred watts to several megawatts.

It is a further object and feature of the present invention to provide thermal-transfer modules capable of reducing the potential for critical damage due to micrometeoroid and orbital debris (MMOD) impacts. A further primary object and feature of the present invention is to provide such a system that is efficient, cost-effective, and useful. Other objects and features of this invention will become apparent with reference to the following descriptions.

SUMMARY OF THE INVENTION

In accordance with a preferred embodiment hereof, this invention provides a system, relating to heat transfer between at least one heat load and at least one surrounding environment using at least one heat-transfer fluid, such system comprising: a thermal-transfer module structured and arranged to assist thermal transfer between the at least one heat-transfer fluid and the at least one surrounding environment; wherein such thermal-transfer module comprises at least one thermal-interaction facesheet comprising a sheet-surface area structured and arranged to thermally interact with the at least one surrounding environment, in thermal interaction with such at least one thermal-interaction sheet, at least one fluid channel structured and arranged to channel the at least one heat-transfer fluid within such thermal-transfer module, and at least one modular engager structured and arranged to assisting modular engagement of such thermal-transfer module with at least one other such thermal-transfer module; wherein such at least one modular engager comprises at least one solid-state-welding facilitator structured and arranged to facilitate fixedly joining such at least one modular engager to at least one other such modular engager by at least one solid-state welding process; wherein such at least one solid-state-welding facilitator comprises at least one continuous edge structured and arranged to assist formation with at least one other such at least one continuous edge, a continuously weldable joint, and a material thickness less than or equal to about 0.1 inch (2.5 millimeters); and wherein such thermal-transfer module comprises a single extruded piece.

Moreover, it provides such a system wherein such thermal-transfer module further comprises: a longitudinal axis; and transverse to and extending continuously along such longitudinal axis, a fixed cross-sectional profile; wherein such at least one fluid channel and such at least one continuous edge are in parallel orientation with such longitudinal axis. Additionally, it provides such a system wherein such inner channel surface comprises an inner channel surface area equal to or less than one half such sheet-surface area of such at least one thermal-interaction sheet. Also, it provides such a system wherein such thermal-transfer module comprises exactly one such at least one thermal-interaction facesheet and exactly one such at least one fluid channel. In addition, it provides such a system wherein such thermal-transfer module comprises at least one metallic material. And, it provides such a system wherein such at least one metallic material comprises substantially aluminum.

Further, it provides such a system comprising: at least one radiator assembly structured and arranged to provide expanded heat-transfer capacity between the at least one heat load and the at least one surrounding environment; wherein such at least one radiator assembly comprises a plurality of such thermal-transfer modules; and at least one friction-stir weld structured and arranged to fixedly join such thermal-transfer modules of such plurality. Even further, it provides such a system wherein such at least one friction-stir weld is structured and arranged to continuously join two adjacent such at least one continuous edges of at least two such thermal-transfer modules. Moreover, it provides such a system wherein such at least one thermal-interaction facesheet further comprises: at least two such at least one continuous edges; and a geometric reference plane at least containing both such at least one edges. Additionally, it provides such a system wherein such at least one thermal-interaction facesheet further comprises: an outer surface comprising such sheet-surface area; wherein such outer surface is parallel with such geometric reference plane.

Also, it provides such a system wherein: such at least one thermal-interaction facesheet further comprises an outer surface comprising such sheet-surface area; and such outer surface non-planar. In addition, it provides such a system wherein such outer surface comprises at least one curve. And, it provides such a system wherein such at least one curve comprises a fixed radius. Further, it provides such a system wherein such at least one fluid channel of such thermal-transfer module is located about equidistant of both such at least one edges. Even further, it provides such a system wherein such at least one radiator assembly comprises a substantially parallel arrangement of respective such geometric reference planes of such plurality of such thermal-transfer modules.

Moreover, it provides such a system wherein such at least one radiator assembly comprises at least one non-parallel arrangement of such geometric reference planes of such plurality of such thermal-transfer modules. Additionally, it provides such a system wherein such plurality of such thermal-transfer modules of such at least one radiator assembly are arranged to comprise a continuous perimeter.

Also, it provides such a system further comprising: at least one sheet-area modifier structured and arranged to modify such sheet-surface area of such at least one thermal-interaction sheet; wherein such at least one sheet-area modifier comprises at least one additional thermal-interaction facesheet having an additional sheet-surface area structured and arranged to provide additional thermal surface interaction with the at least one surrounding environment, and at least one additional modular engager structured and arranged to assisting modular engagement of such at least one sheet-area modifier with such at least one thermal-transfer module. In addition, it provides such a system wherein such at least one radiator assembly further comprises: such at least one additional thermal-interaction facesheet fixedly joined to at least one such thermal-transfer module of such plurality; wherein such at least one additional thermal-interaction facesheet provides, within such at least one radiator assembly, an increased sheet-surface area in thermal interaction with the at least one surrounding environment; and wherein a ratio of such channel surface and such sheet-surface area is modified. And, it provides such a system further comprising at least one fluid coupler structured and arranged to fluid couple such at least one fluid channel to at least one heat-transfer-fluid circuit in fluid communication with the at least one heat load.

Further, it provides such a system further comprising at least one vehicle comprising such at least one heat-transfer-fluid circuit and the at least one heat load. Even further, it provides such a system further comprising: at least one impact shield to shield such at least one fluid channel from the impact of micrometeoroid and orbital debris originating within the at least one surrounding space environment; wherein such at least one impact shield comprises a solid-material region located continuously between such at least one fluid channel and the at least one surrounding space environment; and wherein such at least one impact shield is integrated integrally within such thermal-transfer module. Even further, it provides such a system wherein: such at least one thermal-interaction facesheet comprises a mean cross-sectional panel thickness; and such solid-material region of at least one impact shield comprises an minimum interstitial thickness at least about twice that of such mean cross-sectional panel thickness.

In accordance with another preferred embodiment hereof, this invention provides a method relating to systems to transfer heat between at least one heat load and at least one surrounding environment using at least one heat-transfer fluid comprising the steps of: extrusion forming a plurality of thermal-transfer modules, each one comprising a single extruded piece structured and arranged to assist thermal transfer between the at least one heat-transfer fluid and the at least one surrounding environment; providing within each such thermal-transfer module at least one thermal-interaction facesheet having a sheet-surface area structured and arranged to thermally interact with the at least one surrounding environment, in thermal interaction with such at least one thermal-interaction sheet, at least one fluid channel for channeling the at least one heat-transfer fluid within such thermal-transfer module, and an inner channel surface, of such at least one fluid channel, structured and arrange to be in thermal interaction with the at least one heat-transfer fluid during such fluid channeling; providing at least one modular spacer structured and arranged to space apart such at least two such thermal-transfer modules of such plurality; providing within each such at least one modular spacer a spacer-surface area structured and arranged to thermally interact with the at least one surrounding environment, selecting a combination of such thermal-transfer modules and such at least one modular spacers to provide a preferred ratio between channel surface areas and combined sheet-surface areas; forming weldable arrangement of such selected combination of such thermal-transfer modules and such at least one modular spacers; forming at least one radiator assembly by fixedly joining such selected combination of such thermal-transfer modules and such at least one modular spacers using one or more substantially continuous welds, wherein such substantially continuous weld is formed by at least one friction-stir-weld process.

Even further, it provides such a method further comprising the step of providing at least one fluid coupler structured and arranged to fluid couple such at least one fluid channel to at least one heat-transfer-fluid circuit in fluid communication with the at least one heat load. Even further, it provides such a method further comprising the step of integrating such at least one radiator assembly within at least one vehicle comprising such at least one heat-transfer-fluid circuit and the at least one heat load.

In accordance with another preferred embodiment hereof, this invention provides a system, relating to heat transfer between at least one heat load and at least one surrounding environment using at least one heat-transfer fluid, such system comprising: a thermal-transfer module structured and arranged to assist thermal transfer between the at least one heat-transfer fluid and the at least one surrounding environment; wherein such thermal-transfer module comprises a substantially planar thermal-interaction facesheet structured and arranged to thermally interact with the at least one surrounding environment, and in thermal interaction with such substantially planar thermal-interaction sheet, a single fluid channel for channeling the at least one heat-transfer fluid within such thermal-transfer module; wherein such substantially planar thermal-interaction facesheet comprises a set of weldable peripheral edges, structured and arranged to assist welded joining of such thermal-transfer module to at least one other such thermal-transfer module using at least one solid-state-welding process; wherein such single fluid channel extends longitudinally from one end of such substantially planar thermal-interaction facesheet to the other and is about equidistant of each such weldable peripheral edge; and wherein such thermal-transfer module comprises a single extruded piece.

In accordance with another preferred embodiment hereof, this invention provides a system, relating to heat transfer between at least one heat load and at least one surrounding environment using at least one heat-transfer fluid, such system comprising: a thermal-transfer assembly structured and arranged to assist thermal transfer between the at least one heat-transfer fluid and the at least one surrounding environment; wherein such thermal-transfer assembly comprises a plurality of thermal-interaction facesheets comprising structured and arranged to thermally interact with the at least one surrounding environment, and in thermal interaction with such plurality of thermal-interaction facesheets, at least one fluid channel structured and arranged to channel the at least one heat-transfer fluid within such thermal-transfer module; wherein such plurality of thermal-interaction factsheets are joined by friction-stir welds; and wherein such at least one thermal-interaction facesheet comprises at least one material thickness less than or equal to about 0.1 inch (2.5 millimeters).

In accordance with another preferred embodiment hereof, this invention provides a system, relating to heat transfer between at least one heat load and at least one surrounding environment using at least one heat-transfer fluid, such system comprising: thermal-transfer means for assisting thermal transfer between the at least one heat-transfer fluid and the at least one surrounding environment; wherein such thermal-transfer means comprises thermal-interaction means for thermally interacting with the at least one surrounding environment, such thermal-interaction means comprising a surface area, in thermal interaction with such thermal-interaction means, fluid channel means for channeling the at least one heat-transfer fluid within such thermal-transfer means, and modular engager means for assisting modular engagement of such thermal-transfer means with at least one other such thermal-transfer means, wherein such modular engager means comprises solid-state-welding facilitator means for facilitating fixedly joining such modular engager means to at least one other such modular engager means by at least one solid-state welding process; wherein such fluid channel means comprises inner channel surface means for thermal surface interaction with the at least one heat-transfer fluid during such channeling; wherein such inner channel surface means comprises a channel surface area equal to or less than one half such surface area of such thermal-interaction means; and wherein such thermal-transfer means comprises a single extruded piece.

BRIEF DESCRIPTION OF THE DRAWINGS

FIG. 4 shows the sectional view 4-4 of FIG. 1 according to the preferred embodiment of FIG. 1.

FIG. 5 shows a diagrammatic representation of a solid-state welding tool used to fixedly join the thermal-transfer modules to form the radiator assemblies of the present invention.

FIG. 8 shows an end view of a thermal-transfer module modified to comprise the additional thermal-interaction facesheet of FIG. 6.

FIG. 10 shows an end view, of a radiator assembly having an alternate assembled geometry, according to another preferred embodiment of the present invention.

DETAILED DESCRIPTION OF THE BEST
MODES AND PREFERRED EMBODIMENTS OF
THE INVENTION

Applicant conceived the present system when faced with the need for a range of durable low-mass radiators that could withstand the dynamic loading associated with operation in a space environment. Thermal control in spacecraft includes the gathering, transfer, and rejection of waste heat from vehicle components to the surrounding space environment. Radiators and similar heat-rejection devices operate by transferring heat from a working fluid to a surface for radiation or convection away from the fluid. In general, heat-rejection apparatus in spacecraft should comprise relatively low mass while exhibiting robust operational reliability.

Problems arise when radiator components are formed by joining flow tubes and independently-formed thin heat-rejection sheets. For example, in testing methods of joining flow tubes to a thin aluminum facesheet, applicant identified significant problems associated with the mechanical performance of these connections when the composite assemblies were subjected to the thermal and structural loading anticipated during mission service. In response, applicant developed the present radiator system 100 including preferred methods for producing lightweight radiator assemblies from pre-formed thermal-transfer modules 102 specifically designed to eliminate the above-noted assembly step and associated performance issues.

Figure 1:
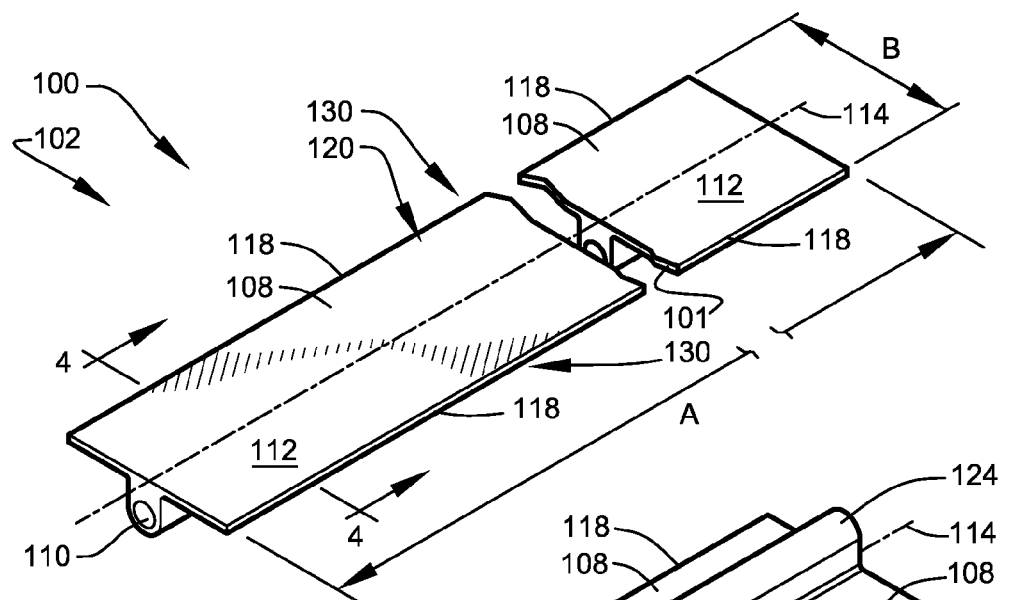
FIG. 1 shows a perspective view, illustrating the outer face of a single thermal-transfer module, according to a preferred embodiment of the present invention.
Figure 2:
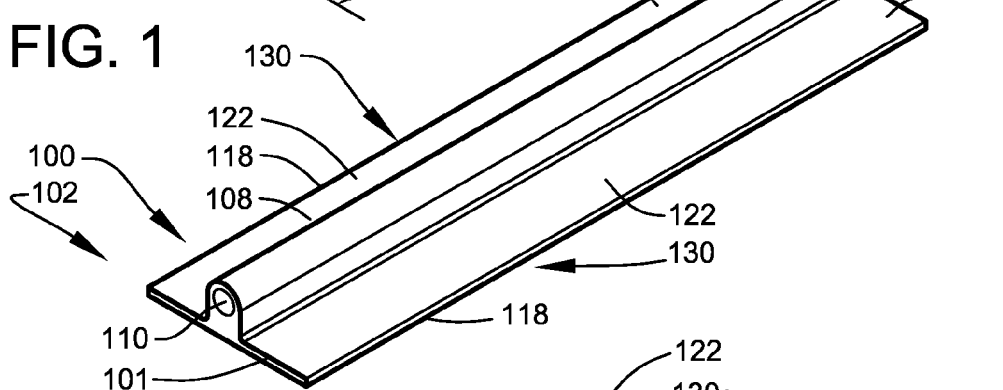
FIG. 2 shows a perspective view, illustrating the inner face of the thermal-transfer module, according to the preferred embodiment of FIG. 1.
Figure 3:
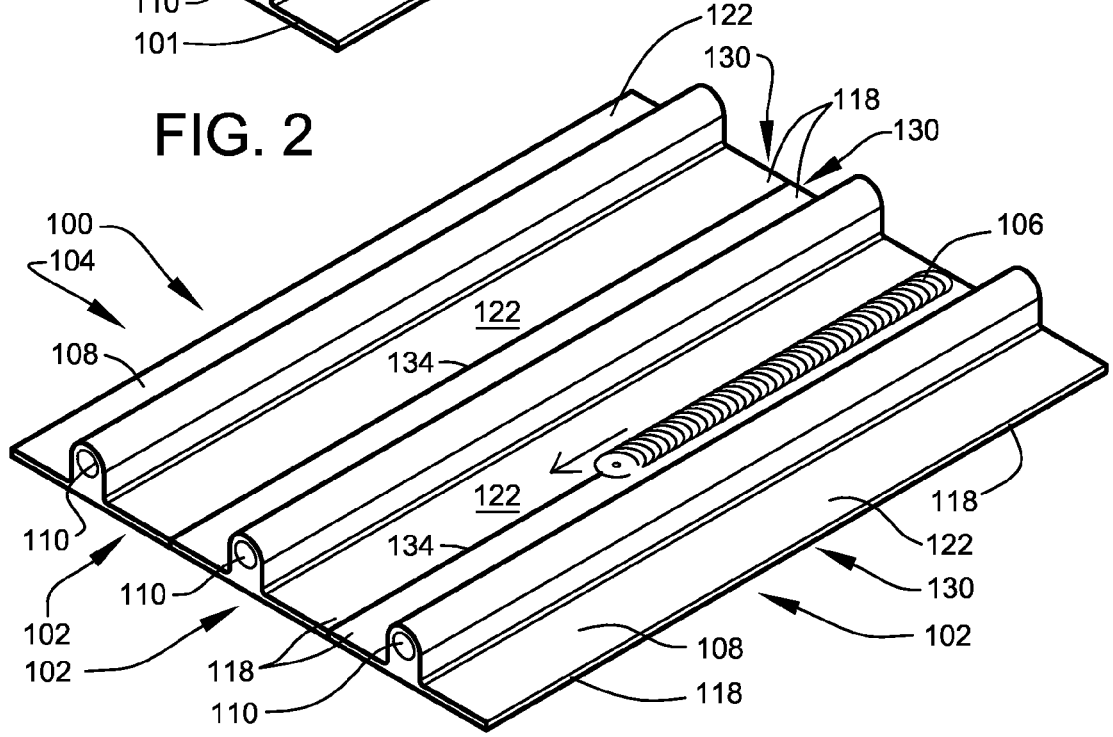
FIG. 3 shows a perspective view, illustrating the inner face of a radiator assembly joining several thermal-transfer modules, according to another preferred embodiment of the present invention.

Referring to the drawings, FIG. 1 shows a perspective view illustrating the outer face of a single thermal-transfer module 102 according to a preferred embodiment of the present invention. FIG. 2 shows a second perspective view illustrating the inner face of the same thermal-transfer module 102, according to the preferred embodiment of FIG. 1. FIG. 3 shows a perspective view, illustrating the inner face of radiator assembly 104 preferably generated by joining together a series of thermal-transfer modules 102 using solid-state welds 106 produced by a solid-state welding process.

In specific reference to FIG. 1 and FIG. 2, each thermal-transfer module 102 preferably incorporates all functional elements of the radiator apparatus into a single unitary piece, as shown. Thus, each unitary thermal-transfer module 102 preferably comprises a thin thermal-interaction facesheet 108 and at least one fluid channel 110, as shown. It is important to note that the thermal-interaction facesheet 108 and fluid channel 110 are preferably combined as integral structures within thermal-transfer module 102, as shown. By preferably using a single common parent material, coefficient of thermal expansion (CTE) mismatch and strength issues are preferably eliminated.

The preferred single-piece unitary arrangement of thermal-transfer module 102 is preferably achieved using at least one extrusion-forming process. In such an extrusion-forming process, a selected material 101 forming transfer module 102 is pressed through an extrusion die having a predefined shaped opening matching the selected profile of thermal-transfer module 102. Material 101 preferably emerges from the extrusion die as a single elongated piece with the same profile as the die opening. The resulting extruded piece preferably comprises an axis of extrusion that, for clarity of description, will be identified in thermal-transfer module 102 as longitudinal axis 114. Thus, the preferred extrusion-forming process produces a thermal-transfer module 102 having a fixed cross-sectional profile 116, as best shown in FIG. 4.

FIG. 4 shows the sectional view 4-4 of FIG. 1 according to the preferred embodiment of FIG. 1. In reference to both FIG. 4 and FIG. 1, a single fixed cross-sectional profile 116 (oriented transverse to longitudinal axis 114) preferably extends continuously along length A of thermal-transfer module 102. The preferred extrusion-forming process of radiator system 100 allows the development of modules having essentially any selected length A. In practical terms, length A is generally limited by the physical size requirements of a particular radiator application and the physical constraints of the extrusion process. This preferred production methodology permits a high degree of scalability and adaptability of the embodiments of radiator system 100 to differing apparatus configurations. Upon reading this specification, those with ordinary skill in the art will now appreciate that, under appropriate circumstances, considering such issues as intended use, field of use, intended markets, etc., other applications such as, for example, terrestrial (non-space) heat rejection, etc., may suffice.

In the preferred embodiment depicted in FIG. 1 and FIG. 2, thermal-transfer module 102 preferably comprises a single facesheet 108 and a single fluid channel 110, as shown. Each facesheet 108 preferably comprises two edges 118 that are preferably located on opposing sides of the sheet, as shown. In one preferred embodiment of the system, each facesheet 108 preferably comprises two linear edges 118 that are preferably arranged in parallel orientation to longitudinal axis 114, as shown. In the preferred embodiment depicted in FIG. 1 and FIG. 2, fluid channel 110 is preferably located within facesheet 108 preferably about equidistant of both edges 118 at midline 141, as shown. As shown in FIG. 2 and FIG. 4, fluid channel 110 projects outwardly from interior surface 122 of facesheet 108 and is preferably arranged in parallel orientation with longitudinal axis 114.

Facesheet 108 preferably comprises an outer thermal-interaction surface 112, which is preferably arranged to thermally interact with the surrounding environment during operation. In the vacuum environment of space, the primary heat rejection mechanism of outer thermal-interaction surface 112 is radiation. Outer thermal-interaction surface 112 comprises a sheet-surface area 120 preferably defined by the selected module length A and transverse width B (as preferably measured between the opposing side edges 118).

Figure 16:
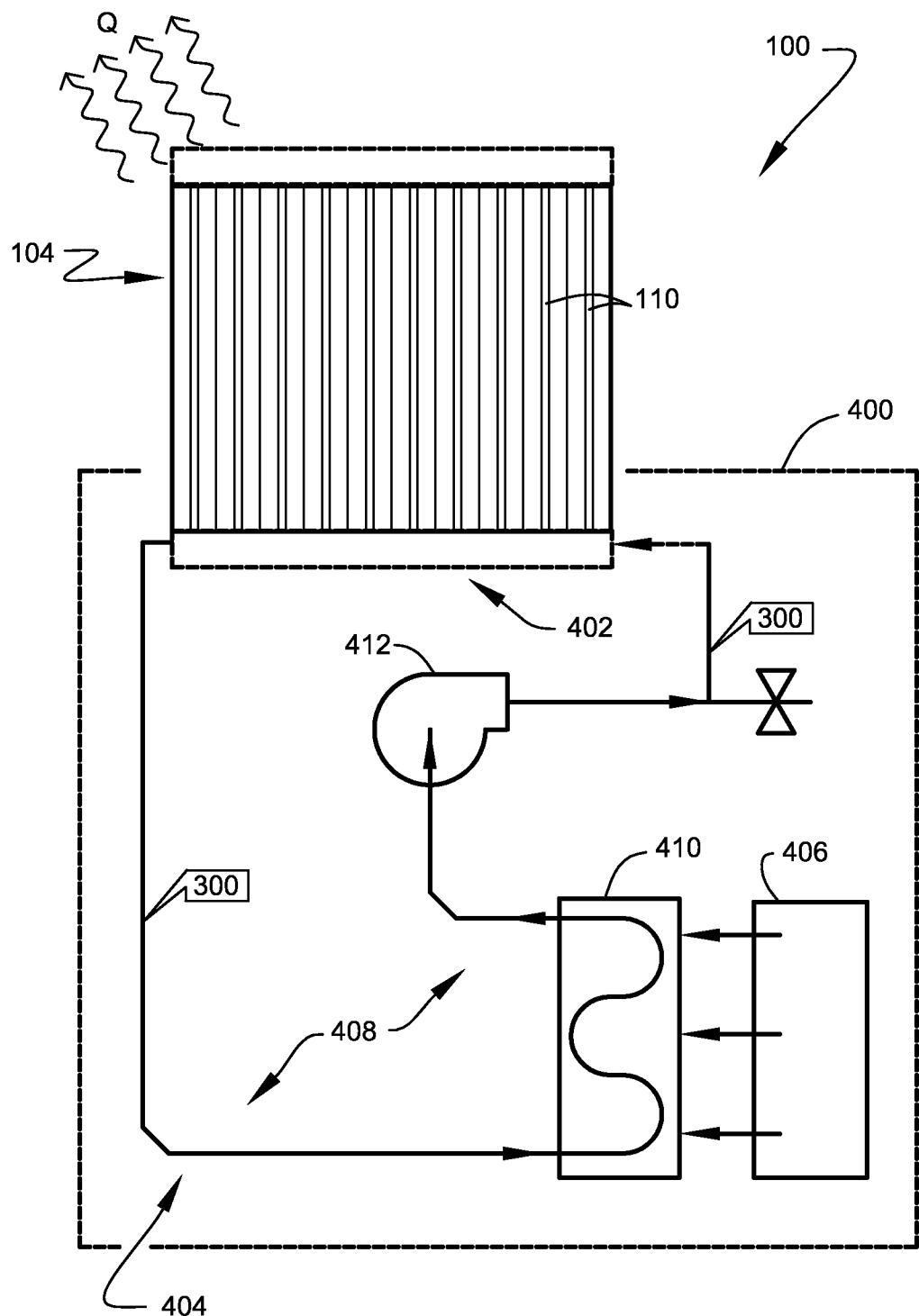
FIG. 16 shows a schematic diagram, illustrating heat-transfer-fluid circuit incorporating a radiator assembly, according to another preferred embodiment of the present invention.

Fluid channel 110 is preferably configured to conduct at least one heat-transfer fluid 300 through thermal-transfer module 102 (see also FIG. 16). Fluid channel 110 is preferably enclosed by an integrally-formed wall 124 that preferably extends along the full length A of the extruded piece. Fluid channel 110 preferably comprises a circular cross-sectional profile to maximize thermal and fluid-flow efficiency. Upon reading this specification, those skilled in the art will now appreciate that, under appropriate circumstances, considering such issues as fluid flow rates, fluid types, cost, heat transfer rates, etc., other cross-section geometries, such as, for example, rectangular, ovular, square, triangular, etc., may suffice.

The integrally-formed wall 124 preferably comprises an inner channel surface 126, also extending along length A, which preferably defines an inner channel surface area 128 that is preferably in fluid communication with heat-transfer fluid 300 during operation. Preferably, inner channel surface 126 of fluid channel 110 is thermally coupled with the external thermal-interaction surface 112 of facesheet 108. The mechanism of heat transfer between these surfaces is primarily thermal conduction through the common material forming the structures.

Referring again to FIG. 4, one preferred dimensional configuration of thermal-transfer module 102 comprises a preferred width B of about 1.5 inches (about 3.8 centimeters) and a preferred facesheet thickness C equal to or less than about 0.04 inch (about 1 millimeter). The midline 141 of the module is thus located about 0.75 inch (about 1.9 centimeters) from each edge 118 and preferably corresponds to the center point of the circular fluid channel 110, as shown.

Fluid channel 110 comprises a preferred inner radius R1 of about 0.9 inch (about 2.3 centimeters) and outer wall radius R2 of about 0.13 inch (about 3.3 millimeters). Outer wall radius R2 is preferably selected to support orbital arc welding of the selected fluid couplings to the terminating ends of fluid channel 110 (see also FIG. 7C). Fillet 113 is preferably provided at the transition from interior surface 122 to integrally-formed wall 124, as shown. To enhance the thermal flow, fillet 113 preferably comprises a fillet radius not less than about 0.03 inch (about 0.8 millimeters).

In the preferred embodiments of radiator system 100, inner channel surface area 128 is about equal to or less than about one half the sheet-surface area 120 of thermal-interaction facesheet 108. For example, for a module having an arbitrary length of 1 unit, a preferred inner radius R1 of about 0.9 unit and a preferred width B of about 1.5 units the ratio between sheet-surface area 120 and inner channel surface area 128 and is about 1.5 square units to about 0.6 square units (preferably less than about 2:1). Upon reading this specification, those with ordinary skill in the art will now appreciate that, under appropriate circumstances, considering such issues as design preference, intended use, thermal requirements, selected materials, technological advances, etc., other area relationships such as, for example, higher or lower ratios, etc., may suffice.

Fluid channel 110 is preferably spaced away from inner channel surface 126 a distance D of about 0.1 inch (about 2.5 millimeters). This preferred arrangement establishes a thickened region of solid material 136 generally located between fluid channel 110 and surrounding space environment. This solid structure preferably functions as an impact shield 138 to protect fluid channel 110 from impacts of micrometeoroid and orbital debris (MMOD), primarily by dissipating the kinetic energy associated with such impacts.

As clearly depicted in FIG. 4, distance D preferably corresponds to the thickness of the protective region of solid material 136. Distance D is preferably at least about twice that of the mean cross-sectional panel thickness of thermal-interaction facesheet 108, as shown. In the present preferred embodiment, the mean cross-sectional panel thickness of thermal-interaction facesheet 108 approaches facesheet thickness C. Upon reading this specification, those with ordinary skill in the art will now appreciate that, under appropriate circumstances, considering such issues as material selection, mission profile, space environment, user preferences, cost, weight requirements, available materials, technological advances, etc., other protective arrangements such as, for example, the use of thin emissive protective films, "bumper" coatings, etc., may suffice.

The preferred embodiments of radiator system 100 are preferably designed to be scalable both at the module level and at the level of the radiator assembly. Thus, it will be understood that alternate preferred implementations of thermal-transfer module 102 are not limited to the specific dimensions disclosed above. In that regard, alternative preferred configurations of alternate thermal-transfer modules 102 comprise alternate preferred widths B preferably ranging between about 1.5 inches and about 4 inches (between about 3.8 centimeters and about 10 centimeters). Alternate preferred facesheet thicknesses C preferably range between less than about 0.04 inch and about 0.1 inch (between about 1 millimeter and about 2.5 millimeters). The midline 141 of the alternate designs are preferably located at distances ranging between about 0.75 inch and about 2 inches from each respective edge 118 (between about 1.9 centimeters and about 5 centimeters). Fluid channels 110 may be scaled to comprise alternate preferred inner radii R1 ranging between about 0.06 inch and about 0.25 inch (between about 1.6 millimeters and about 6.4 millimeters) and preferably comprise outer wall radii R2 ranging between about 0.1 inch to about 0.3 inch (between about 2.5 millimeters and about 7.6 millimeters). It is noted that radii R1 should be larger than about 0.12 inch (about 3 millimeters) to control pressure drop within the channel.

Alternate approaches to MMOD impact mitigation allow alternate fluid channels 110 to be spaced away from their respective inner channel surfaces 126 distances D preferably ranging between 0.0 inch and up to about 0.25 inch (about 6.4 millimeters) depending on the selected approach. Upon reading this specification, those with ordinary skill in the art will now appreciate that, under appropriate circumstances, considering such issues as design preference, available materials, technological advances, cost, etc., other dimensional arrangements such as, for example, thinner facesheets in response to new material advances and welding methodologies, larger and thicker modules for terrestrial applications where weight is not a driving design factor, etc., may suffice.

Material selection for thermal-transfer module 102 is based on multiple performance criteria. Such criteria preferably include compatibility with extrusion-forming processes, compatibility with solid-state welding processes, strength to weight ratio, thermal conductivity, and compatibility with the selected working heat-transfer fluid, among others. Preferred materials include metals, more preferably aluminum, more preferably 6000 series aluminum alloys as designated by the United States Aluminum Association (industry standard terminology used herein). Preferred embodiments of radiator system 100 preferably utilize aluminum 6061 alloy, preferably having between about a T4 and T6 temper condition. Upon reading this specification, those with ordinary skill in the art will now appreciate that, under appropriate circumstances, considering such issues as design preference, user preferences, cost, structural requirements, available materials, technological advances, etc., other material selections such as, for example, alternate aluminum alloys, titanium and its alloys, magnesium alloys, stainless steel, high-temperature polymers, cermets, etc., may suffice. Furthermore, upon reading this specification, those skilled in the art will now appreciate that, under appropriate circumstances, considering such issues as, cost, thermal performance criteria, etc., other material combinations, such as, for example, the inclusion of additional high-emissivity coatings, low-alpha films, applied paints or resins, etc., may suffice.

Thermal-transfer module 102 preferably comprises at least one engagement structure 130 preferably arranged to permit physical engagement of one thermal-transfer module 102 to another. In the preferred configuration of FIG. 1 and FIG. 2, both the edges 118 of facesheet 108 preferably function as engagement structures 130 preferably allowing each thermal-transfer module 102 to engage two additional thermal-transfer modules 102, as generally shown in FIG. 3 (at least embodying herein at least one modular engager structured and arranged to assisting modular engagement of such thermal-transfer module with at least one other such thermal-transfer module).

Referring again to FIG. 3, each edge 118 is preferably configured to assist the formation of a substantially continuous weldable joint 134 with an adjacent edge 118 of a second thermal-transfer module 102. This preferred arrangement is preferably configured to facilitate the fixed joining of two thermal-transfer modules 102, preferably by enabling the use of at least one solid-state-welding process to form a continuous solid-state-weld 106 along weldable joint 134, as shown (at least embodying herein wherein such at least one modular engager comprises at least one solid-state-welding facilitator structured and arranged to facilitate fixedly joining such at least one modular engager to at least one other such modular engager by at least one solid-state welding process and further embodying herein wherein such at least one solid-state-welding facilitator comprises at least one continuous edge structured and arranged to assist formation with at least one other such at least one continuous edge, a substantially continuous weldable joint). Preferably, weldable joint 134 comprises a weldable butt joint, as shown. Preferably, the thickness of each engagement structure 130 at weldable joint 134 comprises a material thickness about equal to facesheet thickness C and should preferably extend inwardly from edge 118 (toward midline 141) not less than about 0.5 inches (1.3 centimeters) to accommodate friction-stir weld fixturing. In the preferred embodiment of FIG. 3, each edge 118 comprises a substantially linear geometry that is preferably configured to assist the formation of a substantially continuous weldable joint 134 with an adjacent linear edge 118 of a second thermal-transfer module 102.

FIG. 5 shows a diagrammatic representation of solid-state welding tool 140 preferably used to fixedly join thermal-transfer modules 102 to form the preferred radiator assemblies 104 of the present invention. In developing the present system, applicant determined that conventional fusion welding techniques produced unacceptable warping of the thin facesheet 108. Research into alternative joining methodologies identified one solid-state welding process as a viable alternative joining process. More specifically, applicant conceived friction stir welding (FSW) as a preferred means for durably joining the preferred 0.04 inch aluminum facesheets 108 without warping or distortion.

In friction-stir welding (FSW), a welding tool 140 equipped with a pin 142 (also referred to as a probe) is preferably rotated and slowly plunged into weldable joint 134 formed between two thermal-interaction facesheets 108. The facesheets are preferably clamped in one or more clamping fixtures that prevent the abutting joint faces from moving apart during the welding process. Pressure applied by the welding tool 140 generates frictional heat between the rotating welding tool 140 and the material of the thermal-interaction sheets 108. This heat softens the aluminum alloy 103 (selected material 101) without reaching the materials melting point. As weld tool 140 moves along the weld line, the plasticized material intermixes and consolidates to form a solid-phase bond fixedly joining the two thermal-interaction sheets 108.

This preferred solid-state welding methodology is capable of consistently producing long high-quality solid-state welds 106 with very low distortion within the thin facesheet extrusions. Applicant determined that, with the correct tooling and fixturing, FSW can be used to weld the preferred 0.04 inch (1 millimeter) 6061-T6 panels together with near T4 tensile strength, which is sufficient for radiator construction without additional processing, depending on performance requirements.

Applicant contracted with Manufacturing Technologies Inc (MTI) of South Bend, Ind. to implement the final tooling and techniques required to accomplish a satisfactory Class 1 FSW in 0.04-inch 6061 aluminum. Successful welds were achieved using a preferred welding tool 140 comprising MTI part number MTI011949 and a preferred pin 142 comprising MTI part number MTI011801. FSW process parameters consistent with those established for aluminum compositions were preferably used. Fixturing to rigidly hold the facesheets during FSW was preferably employed to minimize distortion of the sheet material. Such fixturing was preferably enabled by means of steel plates clamped atop the aluminum facesheets while allowing space for travel of welding tool 140.

During development, welded test panels of 0.04-inch thick (1 millimeter), 6061 aluminum were produced and tested. Radiographic inspection was performed per ASTM E1742, standard practice for radiographic examination, dye penetrant inspection by ASTM E1417, standard practice for liquid penetrant testing, and eddy current inspection. All tests showed no defects in the welds. Additional test samples were delivered to Stork Labs of Newtown, Pa. for tensile, yield and hardness testing. Destructive tensile and yield tests were performed per ASTM B557 and Vickers hardness per ASTM E384.

Material hardness results showed some mechanical softening within solid-state welds 106 relative to the parent material but in line with expected reductions in temper for FSW processes. Tensile strength appeared to be in the high 20 kips per square inch (kpsi) range, generally in line with expectations (25 kpsi-35 kpsi based on approximations from hardness results). As a reference, the recognized ultimate tensile strength range of 6061-T6 is about 42 kpsi minimum (when solution heat-treated and artificially aged); TO (annealed) is about 18 kpsi maximum; and tensile strength in the T4 condition is about 30 kpsi minimum (solution heat treated and naturally aged). Testing produced tensile strength results of about 28.7 kpsi thereby placing the test material close to a T4 temper condition for 6061 aluminum alloy and typical of T4 temper within 6063 aluminum alloys.

In applications requiring higher weld performance, solid-state weld 106 may preferably be "cold worked" to increase tensile strength up to about 20 percent. In is noted that a tensile strength increase of 5 percent would be sufficient to achieve the equivalent of T4 conditioning. Shot-peening, roll-burnishing, and laser hardening of the weld seam are cold-working processes suitable for such optional strengthening step, with immediate roll burnishing being most preferred. It is noted that shot-peening is less preferred in that the technique may potentially disrupt the exterior radiator surface, making application of low-alpha films problematic. Upon reading this specification, those with ordinary skill in the art will now appreciate that, under appropriate circumstances, considering such issues as structural requirements, available materials, etc., other metallurgical treatments such as, for example, applying a solution heat to bring the weld back to a full T6 condition of the parent material, "partial" artificial aging step taking the material to 350-dgrees Fahrenheit and holding for twelve hours to harden the material to a T4 condition, etc., may suffice.

The radiator assembly 104 of FIG. 3 preferably comprises a plurality of thermal-transfer modules 102 that are preferably joined by the above-described solid-state welds 106. By using the preferred pre-fabricated extrusions and by friction stir welding using only the parent material, Coefficient of Thermal Expansion (CTE) mismatch and strength issues are preferably eliminated within the modules.

Thermal-transfer modules 102 preferably function as building blocks enabling the modular construction of diverse heat-rejection apparatus. The preferred embodiments of radiator system 100 are preferably designed to be scalable both at the module level and at the level of radiator assembly 104. The preferred modular design of radiator assembly 104 permits the scaling of radiator units to accommodate a wide range of heat-dissipation requirements and also flexibly accommodates unique physical constraints imposed by differing spacecraft configurations. More specifically, differing numbers of thermal-transfer modules 102 can preferably be combined to form unique a radiator assembly 104 designed to a specific application. This preferred feature solves many integration issues where the space or geometry of the target application is limited or otherwise constrained. Furthermore, the geometry is not limited to only rectangular shapes, as will be further described in FIG. 10 through FIG. 15.

Figure 6:
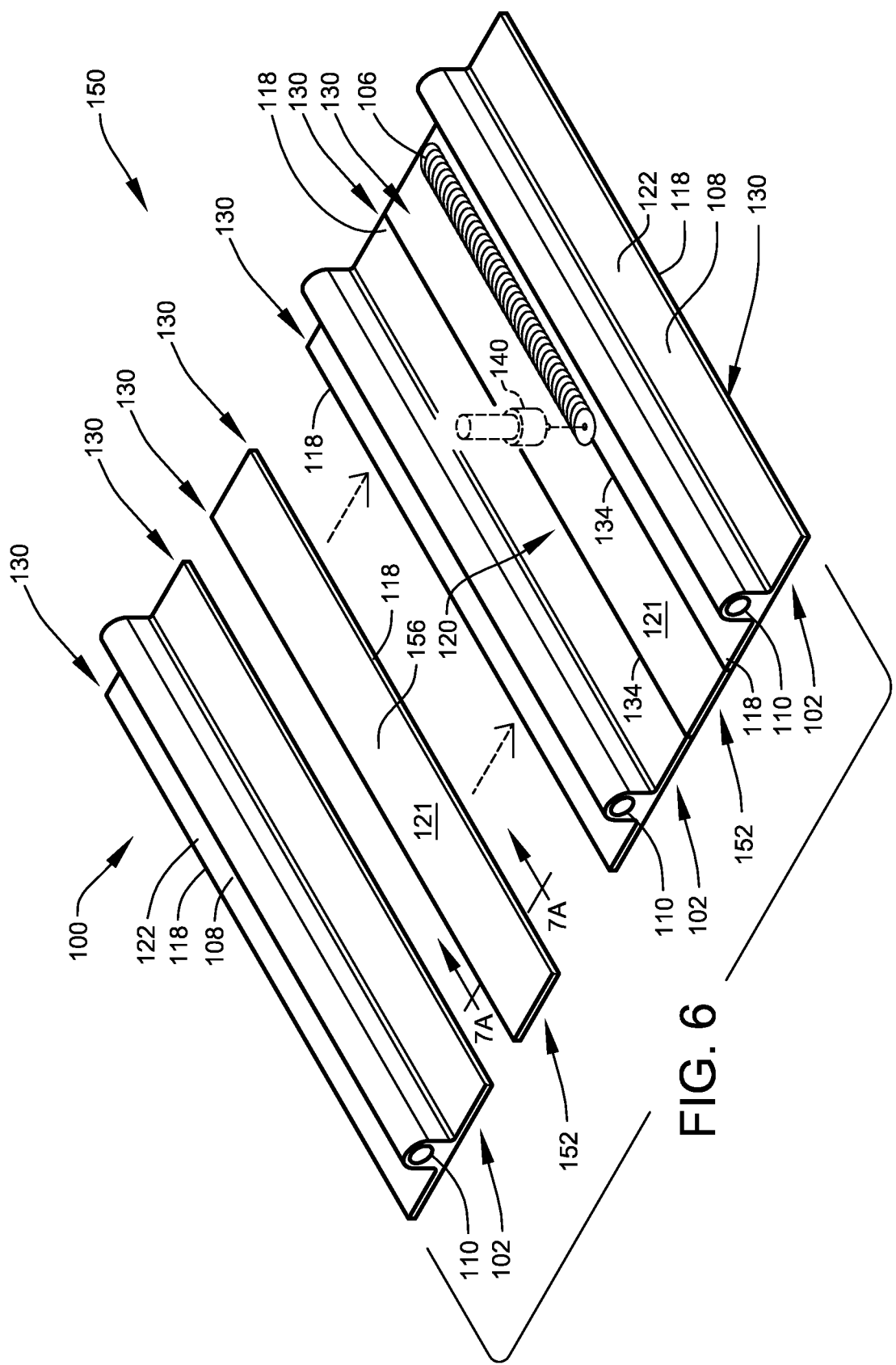
FIG. 6 shows an exploded perspective view of an alternative radiator assembly, utilizing additional modular spacers to space apart several thermal-transfer modules, according to another preferred embodiment of the present invention.
Figure 7A:
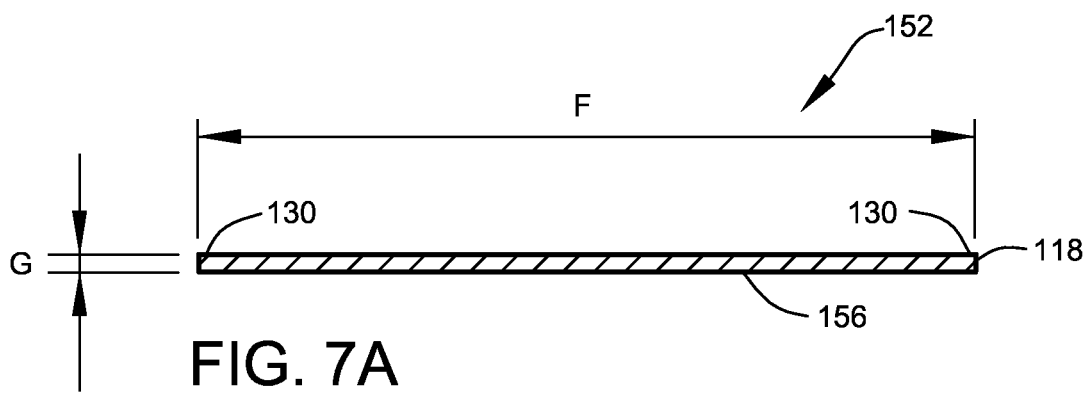
FIG. 7A shows the sectional view 7-7 of FIG. 6 illustrating an additional thermal-interaction surface provided by the modular spacer of FIG. 6.

FIG. 6 shows an exploded perspective view of alternative radiator assembly 150, utilizing additional modular spacers 152 to space apart a plurality of thermal-transfer modules 102, according to another preferred embodiment of the present invention. FIG. 7A shows the sectional view 7A-7A of FIG. 6 illustrating an additional sheet-surface area 121 and optional structural enhancement provided by modular spacer 152 of FIG. 6.

As in the built-up modular assembly of FIG. 3, alternative radiator assembly 150 is preferably configured to expand the capacity for heat transfer from the working fluid and heat rejection to the surrounding environment. By inserting modular spacers 152 between thermal-transfer modules 102, the spacing of fluid channels 110 can preferably be varied. In addition, preferred arrangements of alternate preferred embodiments of such modular spacers 152 function to add structural strength and rigidity to the radiator assembly. This preferred feature allows the performance characteristics of alternative radiator assembly 150 to be modified to address specific design and performance requirements.

The use of modular spacers 152 preferably allows the ratio between sheet-surface area 120 and inner channel surface area 128 to be modified by the system designer, without altering the pre-defined configuration of the base thermal-transfer modules 102.

Each modular spacer 152 (at least embodying herein at least one sheet-area modifier structured and arranged to modify such sheet-surface area of such at least one thermal-interaction sheet) preferably comprises an additional thermal-interaction facesheet 156 having an additional sheet-surface area 121 to provide supplementary thermal surface interaction with the surrounding space environment. Each modular spacer 152 preferably comprises at least one, more preferably two, additional engagement structures 130 configured to assist the engagement of modular spacer 152 with at least one thermal-transfer module 102, as shown in FIG. 6, or alternately preferably, additional modular spacer 152.

Figure 7B:
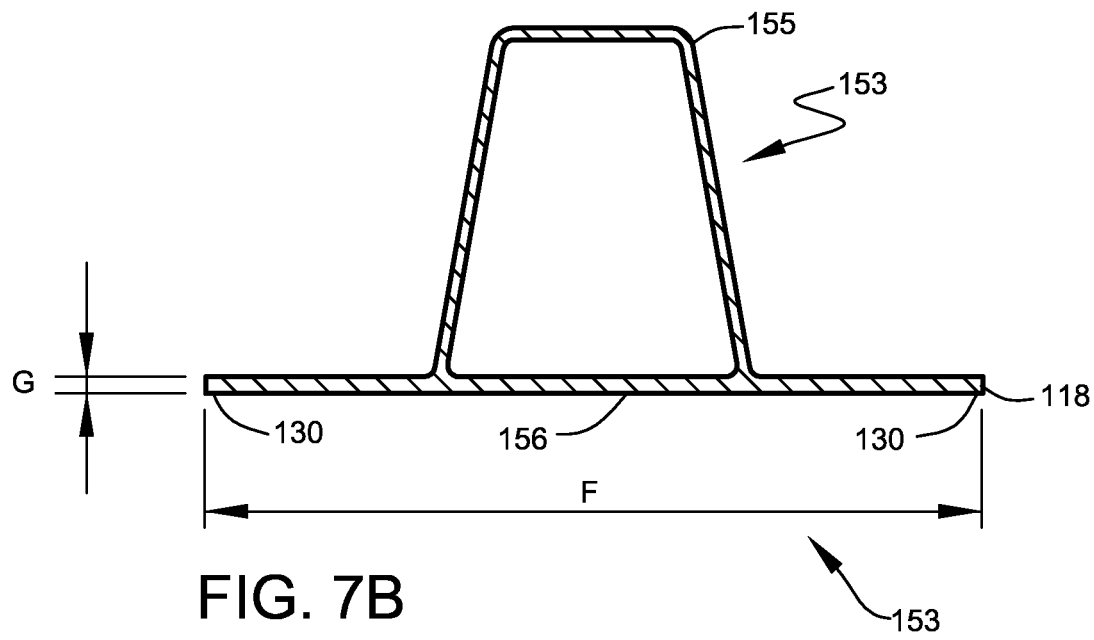
FIG. 7B shows an end view illustrating a reinforced modular spacer, according to another preferred embodiment of the present invention.

FIG. 7B shows an end view illustrating reinforced modular spacer 153, according to another preferred embodiment of the present invention. In addition to providing an additional thermal-interaction facesheet 156 with additional sheet-surface area 121, reinforced modular spacer 153 additionally provides structural reinforcement in the form of structural support member 155, as shown. Structural support member 155 preferably reinforces the relatively thin facesheet by substantially increasing member depth perpendicular to the facesheet, as shown. This preferred arrangement increases the ability of reinforced modular spacer 153 to resist defection under various bending moments. This also assists in supporting the thermal-transfer modules 102 to which reinforced modular spacer 153 is fixedly joined.

Reinforced modular spacer 153 is preferably formed as a single piece by an extrusion process. Alternately preferably, structural support member 155 comprises a separately-formed member rigidly joined to the facesheet, preferably by welding or alternatively preferably by bonding.

Figure 7C:
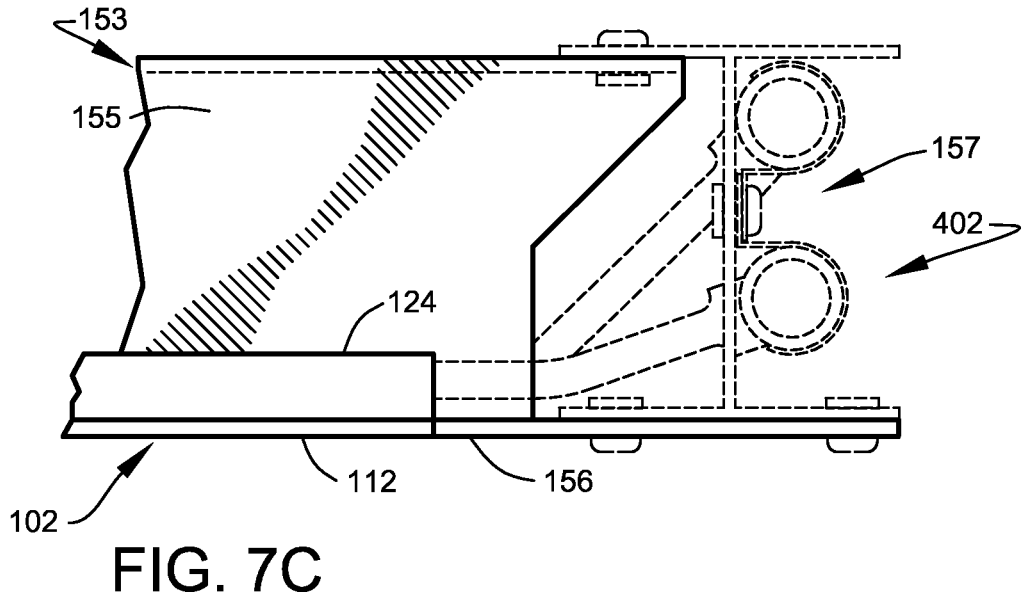
FIG. 7C shows a partial side view schematically illustrating a preferred end termination of a preferred embodiment of radiator assembly, according to another preferred embodiment of the present invention.

FIG. 7C shows a partial side view schematically illustrating a preferred end termination 157 of a preferred embodiment of radiator assembly 104. FIG. 7C shows reinforced modular spacer 153 of FIG. 7B joined to a thermal-transfer module 102 in a preferred arrangement. Upon reading this specification, those with ordinary skill in the art will now appreciate that, under appropriate circumstances, considering such issues as design preference, cost, thermal requirements, etc., other support arrangements such as, for example, terminating a radiator assembly at an I-beam support, coupling flow channels with a swaged-tube manifold, etc., may suffice.

FIG. 8 shows an end view of thermal-transfer module 102 modified to comprise the additional thermal-interaction facesheet 156 of modular spacer 152. As illustrated in FIG. 6 and FIG. 8, additional modular spacers 152 are fixedly joined to the thermal-transfer modules 102 using solid-state welds 106. To facilitate the formation of such solid-state weld 106, the peripheral edge portions of modular spacer 152 comprises a preferred thickness G about equal to thickness C at the weldable edge region of the facesheet. Modular spacer 152 preferably comprises any required width F selected by the heat-rejection system designer. In one preferred embodiment of the system, modular spacer 152 comprises a width F of about 3.5 inches (about 8.9 centimeters).

As illustrated in FIG. 8, the modified assembly preferably comprises an increased width BB and an accompanying increase in sheet-surface area, preferably combining sheet-surface area 120 and the additional sheet-surface area 121 of the additional thermal-interaction facesheet 156. In this preferred arrangement, the area of outer thermal-interaction surface available to radiate heat to the surrounding environment is increased by the aggregate area of the applied spacers. Thus, the ratio between outer sheet-surface area and inner channel surface areas of fluid channel 110 is preferably modified.

Figure 9:
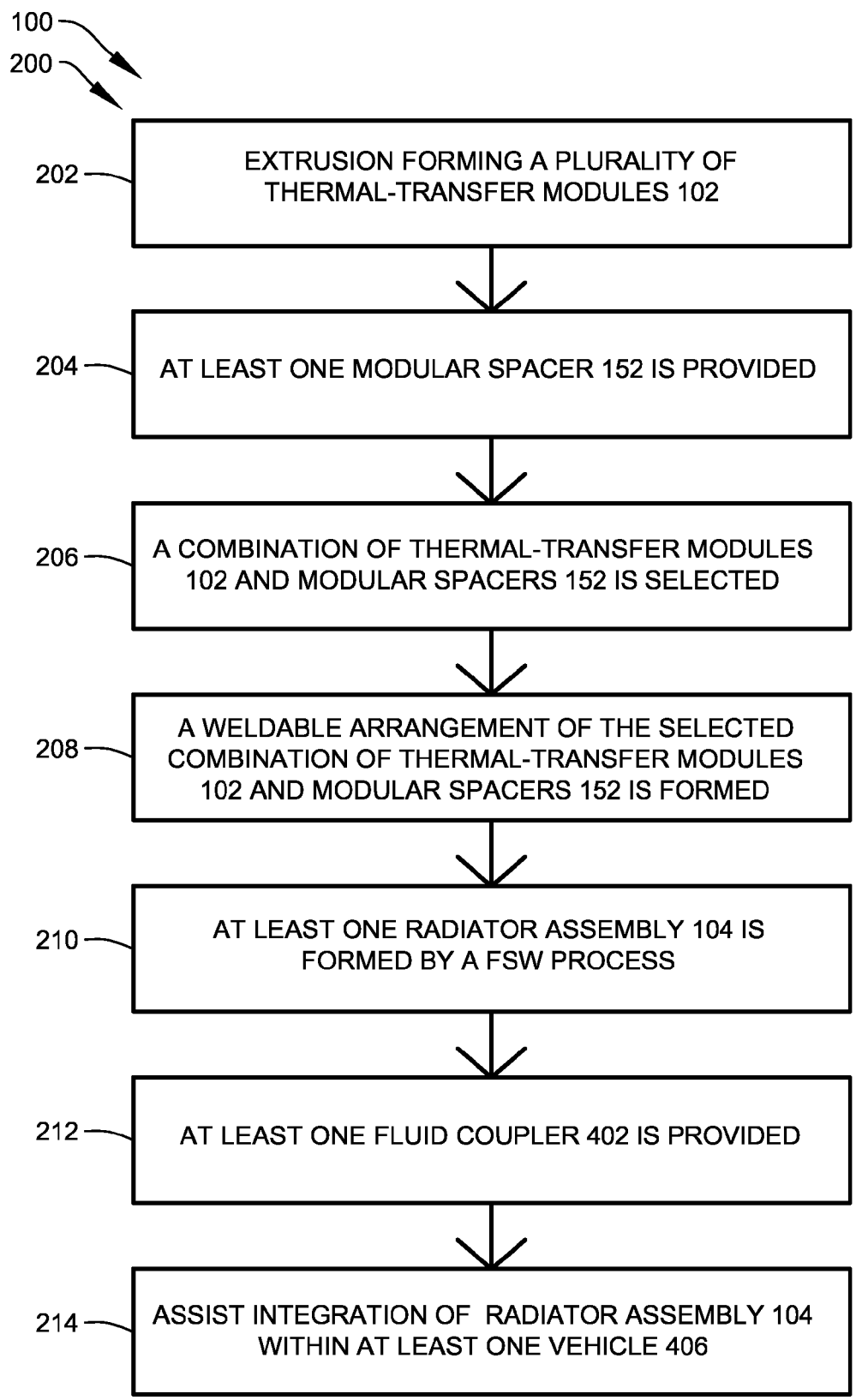
FIG. 9 shows a flow diagram describing a method of selecting a combination of such thermal-transfer modules and such modular spacers to provide a preferred ratio between channel surface areas and combined sheet-surface areas, according to another preferred embodiment of the present invention.

FIG. 9 shows a flow diagram describing method 200 of selecting a combination of thermal-transfer modules 102 and modular spacers 152 to provide a preferred ratio between the inner channel surfaces of fluid channel 110 and combined sheet-surface areas exposed to the external space environment. In that regard, method 200 preferably comprises the initial step 202 of extrusion forming a plurality of thermal-transfer modules 102, each one comprising a single extruded piece structured and arranged to assist thermal transfer between a working heat-transfer fluid and a surrounding environment. Next, as indicated in preferred step 204, at least one modular spacer 152 is provided to space apart at least two thermal-transfer modules 102 of such plurality. Next, as indicated in preferred step 206, a combination of thermal-transfer modules 102 and modular spacers 152 is selected by the system designer provide a preferred ratio between inner fluid-channel surface areas and combined sheet-surface areas. Next, a weldable arrangement of the selected combination of thermal-transfer modules 102 and modular spacers 152 is formed, as indicated in preferred step 208. Next, as indicated in preferred step 210, at least one radiator assembly 104 is formed by fixedly joining the selected combination of thermal-transfer modules 102 and modular spacers 152 using one or more substantially continuous welds, wherein the weld is preferably formed by at least one friction-stir-weld process.

In the additional preferred step 212, at least one fluid coupler 402 is selected to operably couple fluid channel 110 to at least one pumped fluid loop identified herein as heat-transfer-fluid circuit 404. This step at least preferably includes providing technical information supporting the connection of radiator assembly 104 with the heat-rejection subsystem of a vehicle. This step may preferably include providing design and integration support fluid coupler 402, and may preferably include supplying of hardware, such as, for example, a set of swage couplings incorporated within at least one manifold assembly.

In the later diagram of FIG. 16, heat-transfer-fluid circuit 404 will be shown to be in fluid communication with at least one heat load 406 of (spacecraft) vehicle 400. In the present disclosure the term vehicle shall at least be defined as a craft or similar vessel, either manned or unmanned, designed to operate in a space or a terrestrial environment. In the additional preferred step 214, assistance is preferably provided to support the integration of radiator assembly 104 within at least one (spacecraft) vehicle 400 comprising such heat-transfer-fluid circuit 404 and the heat load 406. This step at least preferably includes providing technical support relating to the integration of one or more radiator assemblies 104 into target application.

FIG. 10 shows a partial end view of an alternate radiator assembly 220 having an alternate assembled geometry, according to another preferred embodiment of the present invention. Alternate radiator assembly 220 preferably comprises a plurality of thermal-transfer modules 102 that are preferably joined by solid-state welds 106, as shown. Each thermal-transfer modules 102 comprises a facesheet 108 containing two continuous edges 118. To assist in describing the preferred geometrical relationships between modules, the orientation of each facesheet 108 will be described in terms of a geometric reference plane 224 at least containing both edges of a respective facesheet 108, as shown.

In thermal-transfer modules 102, thermal-interaction surface 112 is preferably parallel with its geometric reference plane 224 (at least embodying herein wherein such at least one thermal-interaction facesheet further comprises an outer surface comprising such sheet-surface area, wherein such outer surface is parallel with such geometric reference plane). Both the radiator assembly 104 of FIG. 3 and alternative radiator assembly 150 of FIG. 6 preferably comprise a substantially parallel arrangement of respective geometric reference planes 224. This preferred arrangement preferably produces substantially planar radiator geometries. More specifically, the respective geometric reference planes 224 of both the radiator assembly 104 of FIG. 3 and alternative radiator assembly 150 of FIG. 6 fall in a single common plane. This is not true for other preferred radiator assemblies.

Referring again to FIG. 10, alternate radiator assembly 220 preferably comprises a non-parallel arrangement of respective geometric reference planes 224. More specifically, respective geometric reference planes 224 of alternate radiator assembly 220 are arranged so that the angle θ between respective adjacent planes is greater than about 180 degrees. This preferred arrangement may be used produce non-planar radiator assemblies, as shown, thus allowing for designs that approach a curved profile. Upon reading this specification, those with ordinary skill in the art will now appreciate that, under appropriate circumstances, considering such issues as design preference, cost, thermal requirements, etc., other arrangements such as, for example, the use of additional modular spacers, etc., may suffice.

Figure 11:
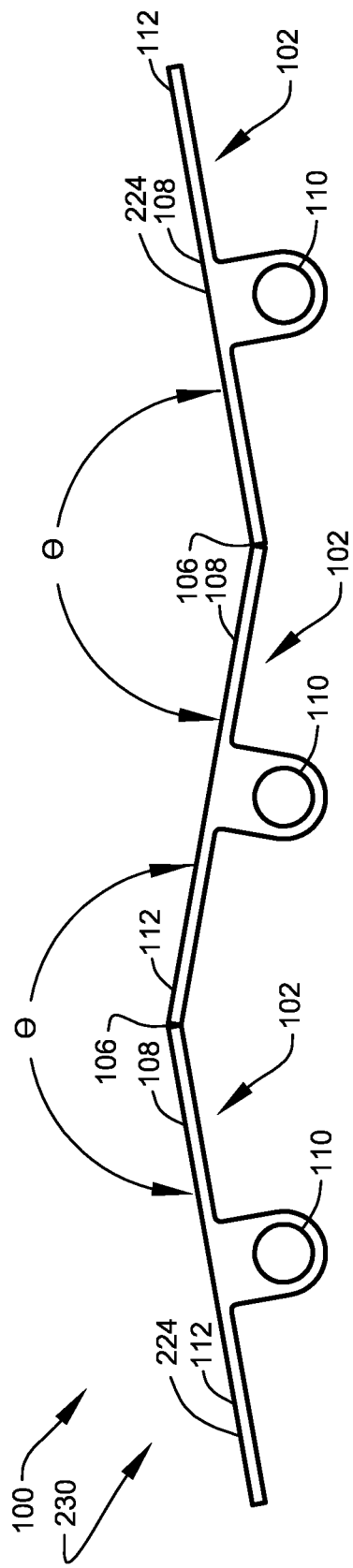
FIG. 11 shows an end view, of a radiator assembly having an alternate assembled geometry, according to another preferred embodiment of the present invention.

FIG. 11 shows an end view of an alternate radiator assembly 230 having an alternate assembled geometry, according to another preferred embodiment of the present invention. Alternate radiator assembly 230 also preferably comprises a plurality of thermal-transfer modules 102 that are preferably joined by solid-state welds 106, as shown. Like alternate radiator assembly 220, alternate radiator assembly 230 preferably comprises a non-parallel arrangement of respective geometric reference planes 224. Preferably, respective geometric reference planes 224 of alternate radiator assembly 230 are arranged so that the angle θ between respective adjacent planes is either greater than or less than about 180 degrees. More specifically, respective geometric reference planes 224 of alternate radiator assembly 230 are preferably arranged so that the angles θ between adjacent geometric referenced planes 224 alternate between acute and obtuse angularity. This preferred arrangement may be used to produce corrugated radiator assemblies, as shown.

Figure 12:
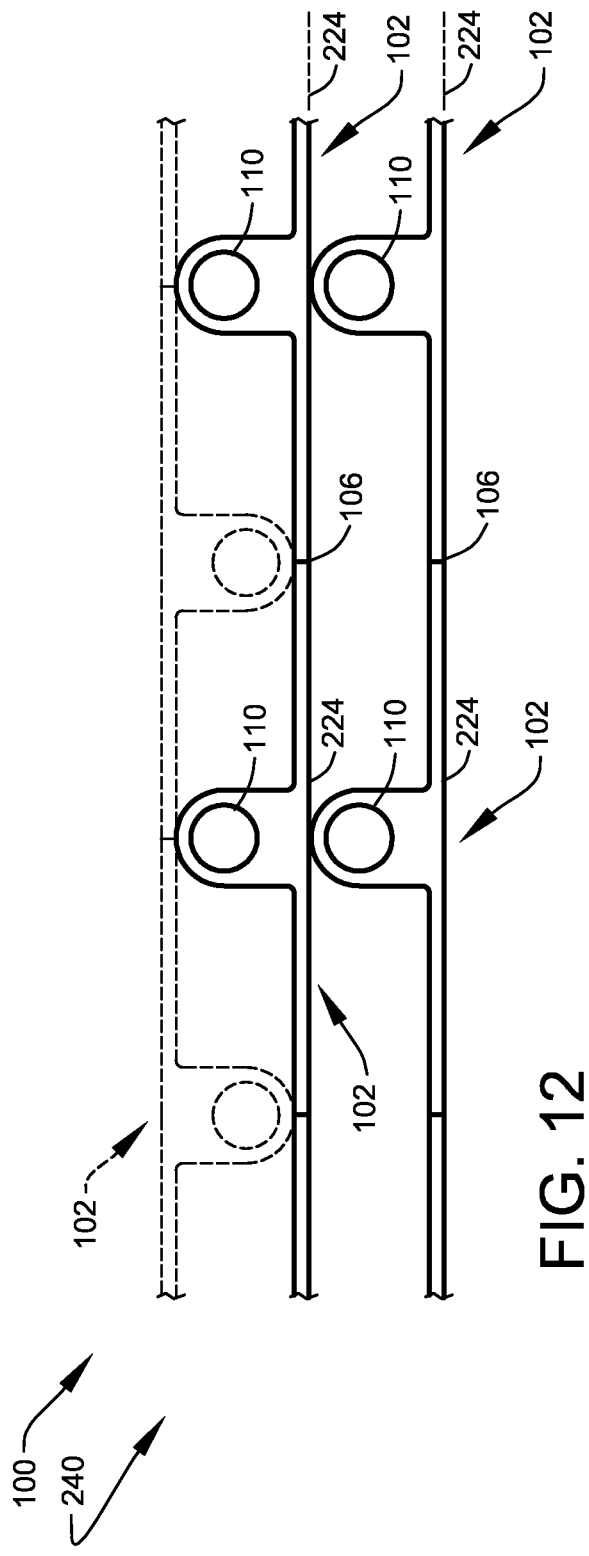
FIG. 12 shows an end view, of a radiator assembly having another alternate assembled geometry, according to an additional preferred embodiment of the present invention.

FIG. 12 shows an end view of a heat-rejection assembly 240 having another alternate assembled geometry, according to an additional preferred embodiment of the present invention. Heat-rejection assembly 240 preferably comprise a substantially parallel arrangement of respective geometric reference planes 224, however, the thermal-transfer modules 102 are preferably stacked to produce a functional heat exchanger, as shown.

Figure 13:
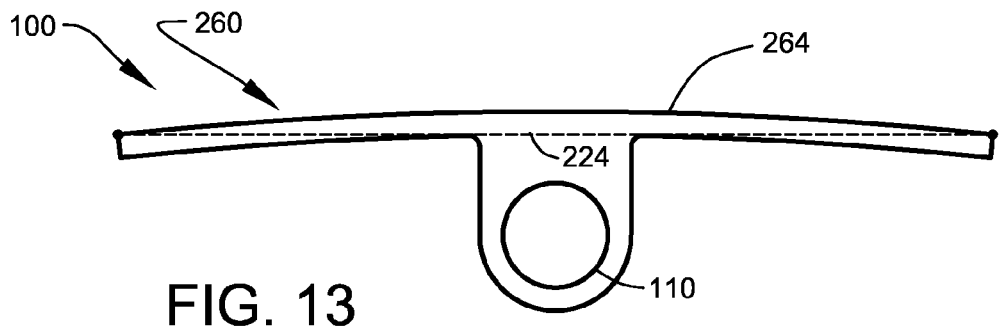
FIG. 13 shows an end view, of an additional alternate thermal-transfer module, according to another preferred embodiment of the present invention.
Figure 14:
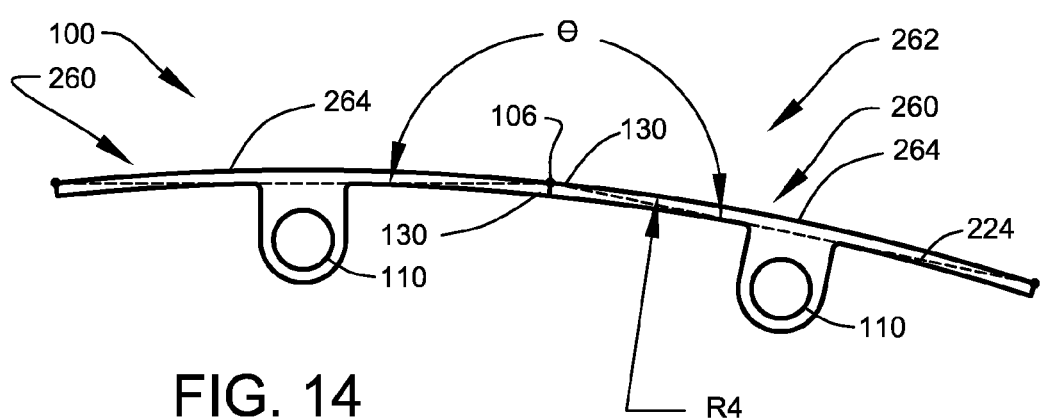
FIG. 14 shows an end view, of an alternate radiator assembly, joining several of the alternate thermal-transfer modules of FIG. 14, according to another preferred embodiment of the present invention.
Figure 15:
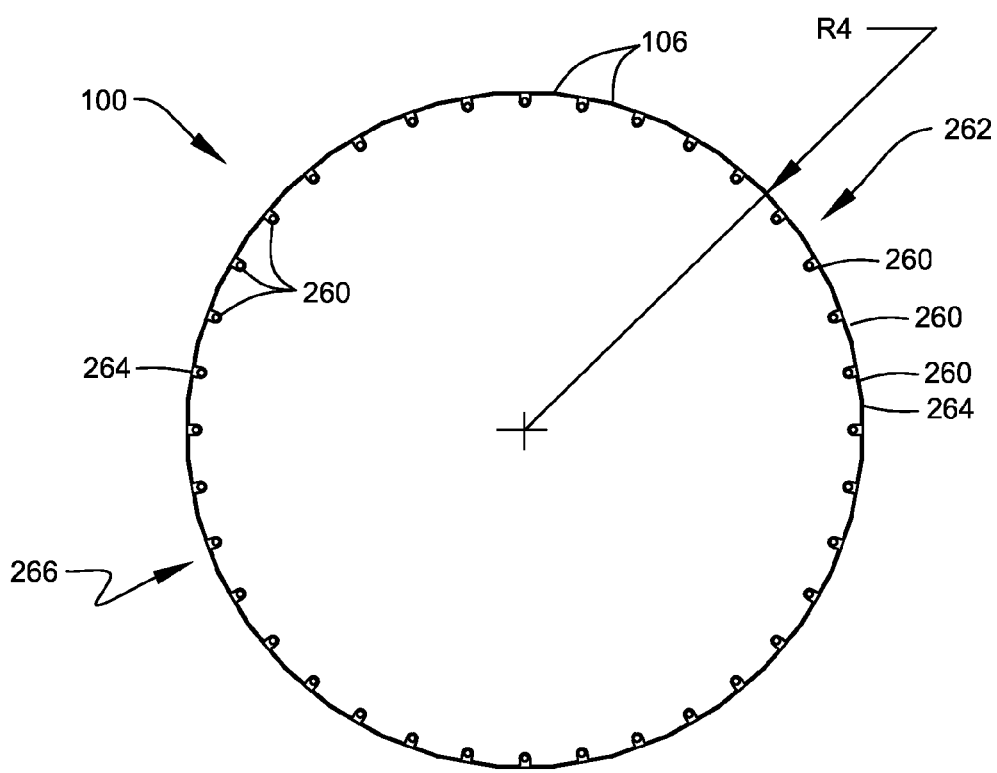
FIG. 15 shows an end view, of an alternate radiator assembly having an enclosed assembled geometry, according to another preferred embodiment of the present invention.

FIG. 13 shows an end view of an additional alternate thermal-transfer module 260, according to another preferred embodiment of the present invention. FIG. 14 shows a partial end view of an alternate radiator assembly 262, joining several alternate thermal-transfer modules 260 of FIG. 13, according to another preferred embodiment of the present invention. FIG. 15 shows an end view of alternate radiator assembly 262 having an enclosed assembled geometry, according to another preferred embodiment of the present invention. Alternate thermal-transfer module 260 preferably comprises a single extruded piece preferably including a thin thermal-interaction facesheet 268 and at least one fluid channel 110, as shown. The outer surface 264 of facesheet 268 is preferably non-planar, as shown. More preferably, the outer surface 264 of facesheet 268 comprises at least one curve. Most preferably, the outer surface 264 of the alternate facesheet 268 comprises at least one curve having a fixed radius R4. This preferred arrangement permits the formation of radiator apparatus have a continuous closed perimeter 266, as shown (at least embodying herein wherein such plurality of such thermal-transfer modules of such at least one radiator assembly are arranged to comprise a continuous perimeter). This preferred geometry is useful in producing cylindrical-shaped external radiators, which may be integrated within the outer envelope of vehicle.

FIG. 16 shows a schematic diagram illustrating radiator assembly 104 operably integrated within vehicle 400, according to a preferred embodiment of the present invention. Radiator assembly 104 is preferably integrated within heat-transfer-fluid circuit 404, as shown. Heat-transfer-fluid circuit 404 is preferably depicted as a pumped fluid loop 408 that circulates a heat-transfer fluid 300 between heat load 406 and radiator assembly 104. If the working fluid at heat load 406 is separated from heat-transfer fluid 300, a heat exchanger 410 (see also FIG. 12) is preferably included within the design, as shown. One or more fluid-circulating pumps 412 may be used to circulate heat-transfer fluid 300 through radiator assembly 104. Upon reading this specification, those with ordinary skill in the art will now appreciate that, under appropriate circumstances, considering such issues as design preference, thermal requirements, mission duration, available materials, technological advances, etc., other system arrangements such as, for example, passive circulation systems, heat pipes, heat pumps, accummulators, sensors, controls, redundant subsystems, etc., may suffice.

Radiator assembly 104 further comprises at least one fluid coupler 402 structured and arranged to the fluid couple fluid channels 110 to heat-transfer-fluid circuit 404. In one preferred embodiment of the system, fluid coupler 402 comprises a terminating header or other fluid manifold structure that preferably couples the individual fluid channels 110 to the fluid transport lines of pumped fluid loop 408. In one preferred embodiment of the system, fluid coupler 402 comprises a manifold arrangement of swaged tubes supported within a beam-like structural end frame (see also FIG. 7C). In one preferred arrangement, two separated manifold flow tubes are preferred within fluid coupler 402 to allow for two flow paths affording additional MMOD protection.

As heat-transfer fluid 300 flows through radiator assembly 104, heat is radiated into the surrounding space environment, thus reducing the heat content of heat-transfer fluid 300. The cooled fluid is preferably returned from radiator assembly 104 where it again collects waste heat from heat load 406. This process is repeated continuously, as required, to provide the required heat rejection Q.

In alternate embodiments of the above-described thermal-transfer modules, the fluid tubes and facesheets may comprise individual pre-formed pieces joined together by bonding, welding, or other joining process, although these embodiment arrangements are less preferred than their extrusion-formed counterparts. In one such alternate embodiment, heat transfer tubes are preferably mounted to the facesheets using thermally conductive epoxy, preferably an aluminum based thermally conductive epoxy such as "Durlaco 132" (available commercially from Cotronics Corp. in Brooklyn, N.Y.). Upon reading this specification, those skilled in the art will now appreciate that, under appropriate circumstances, considering such issues as materials, available epoxies, required thermal conductivity, etc., other methods of mounting, such as, for example, welding, brazing, bonding, etc., may suffice.

Although applicant has described applicant's preferred embodiments of this invention using metric standardized units, such measurements have been provided only for the convenience of the reader and should not be read as controlling or limiting. Instead, the reader should interpret any measurements provided in English standardized units as controlling. Any measurements provided in metric standardized units were merely derived through strict mechanical coding, with all converted values rounded to one decimal place. Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A radiator system comprising:
   a) a thermal-transfer module structured and arranged to assist thermal transfer between a heat-transfer fluid and a surrounding environment;
   b) wherein said thermal-transfer module comprises
      i) a thermal-interaction facesheet comprising a sheet-surface area structured and arranged to thermally interact with the surrounding environment, the thermal-interaction facesheet having a sheet thickness of about equal to or less than about 0.04 inches;
      ii) a fluid channel structured and arranged to channel a heat-transfer fluid within the thermal-transfer module, the fluid channel having an integrally formed wall and having a wall thickness, the fluid channel integrated with the thermal-interaction facesheet as a single extruded material, at least some of the material separating the surrounding environment and the fluid channel by at least the sheet thickness and the wall thickness, and
      iii) at least one modular engager structured and arranged to assisting modular engagement of the thermal-transfer module with at least one other thermal-transfer module;
   c) wherein the at least one modular engager is fixedly joined with at least one other modular engager of the at least one other thermal-transfer module by a solid-state weld.

2. The system according to claim 1 wherein the thermal-transfer module further comprises:
   a) a longitudinal axis; and
   b) transverse to and extending continuously along said longitudinal axis, a fixed cross-sectional profile;
   c) wherein the fluid channel and a continuous edge of the at least one modular engager are in parallel orientation with the longitudinal axis.

3. The system according to claim 1 wherein the at least some of the material separates the surrounding environment and the fluid channel by a distance equal to or greater than about 0.1 inches.

4. The system according to claim 1 wherein the thermal-interaction facesheet comprises at least one continuous edge, the at least one continuous edge comprising the at least one modular engager.

5. The system according to claim 1 wherein the material comprises at least one metallic material.

6. The system according to claim 5 wherein the at least one metallic material comprises aluminum.

7. The system according to claim 1 further comprising
   a) a radiator assembly structured and arranged to provide expanded heat-transfer capacity between a heat load and the surrounding environment;
   b) wherein the radiator assembly comprises
      i) a plurality of the thermal-transfer modules; and
      ii) at least one friction-stir weld structured and arranged to fixedly join the thermal-transfer modules.

8. The system according to claim 7 wherein the at least one friction-stir weld is structured and arranged to continuously join continuous edges of at least two thermal-transfer modules.

9. The system according to claim 8 wherein the thermal-interaction facesheet further comprises:
   a) at least two continuous edges; and
   b) a geometric reference plane at least containing the at least two continuous edges.

10. The system according to claim 9 wherein the thermal-interaction facesheet further comprises:
    a) an outer surface comprising the sheet-surface area;
    b) wherein the outer surface is parallel with the geometric reference plane.

11. The system according to claim 9 wherein:
    a) the thermal-interaction facesheet further comprises an outer surface comprising the sheet-surface area; and
    b) the outer surface is non-planar.

12. The system according to claim 11 wherein the outer surface comprises at least one curve.

13. The system according to claim 12 wherein the at least one curve comprises a fixed radius.

14. The system according to claim 9 wherein the fluid channel of the thermal-transfer module is located about equidistant of both continuous edges.

15. The system according to claim 9 wherein the radiator assembly comprises a substantially parallel arrangement of geometric reference planes of the plurality of thermal-transfer modules.

16. The system according to claim 9 the radiator assembly comprises at least one non-parallel arrangement of geometric reference planes of the plurality of thermal-transfer modules.

17. The system according to claim 16 wherein the plurality of thermal-transfer modules of the radiator assembly are arranged to comprise a continuous perimeter.

18. The system according to claim 7 further comprising:
a) at least one modular spacer structured and arranged to modify the sheet-surface area of the thermal-interaction facesheet;
b) wherein the at least one modular spacer comprises
   i) at least one additional thermal-interaction facesheet having an additional sheet-surface area structured and arranged to provide additional thermal surface interaction with the surrounding environment, and
   ii) at least one additional modular engager structured and arranged to assisting modular engagement of the at least one modular spacer with the thermal-transfer module.

19. The system according to claim 18 wherein the radiator assembly further comprises:
a) the at least one additional thermal-interaction facesheet fixedly joined to at least one of the plurality of thermal-transfer modules;
b) wherein the at least one additional thermal-interaction facesheet provides, within the radiator assembly, an increased sheet-surface area in thermal interaction with the surrounding environment; and
c) wherein a ratio of an inner channel surface area of the integrally formed wall and the sheet-surface area is modified.

20. The system according to claim 18 wherein the at least one additional thermal-interaction facesheet of the at least one modular spacer comprises at least one structural stiffener to structurally stiffen the at least one modular spacer.

21. The system according to claim 7 further comprising at least one fluid coupler structured and arranged to fluidly couple the fluid channel to at least one heat-transfer-fluid circuit in fluid communication with a heat load.

22. The system according to claim 1 further comprising one or more fluid-circulating pumps configured to circulate the heat-transfer fluid through the fluid channel.

23. The system according to claim 1 further comprising:
a) at least one impact shield to shield the fluid channel from an impact originating from the surrounding environment;
b) wherein the at least one impact shield comprises the material separating the surrounding environment and the fluid channel; and
c) wherein the at least one impact shield is integrated within the thermal-transfer module.

24. The system according to claim 23 wherein:
the at least one impact shield comprises a minimum interstitial thickness at least about twice that of sheet thickness of the thermal-interaction facesheet.

25. A radiator system comprising:
a) a thermal-transfer module structured and arranged to assist thermal transfer between a heat-transfer fluid and a surrounding environment;
b) wherein said thermal-transfer module comprises
   i) a substantially planar thermal-interaction facesheet structured and arranged to thermally interact with the surrounding environment, the substantially planar thermal-interaction facesheet having a sheet thickness of about equal to or less than about 0.04 inches, and
   ii) a single fluid channel for channeling the heat-transfer fluid within the thermal-transfer module, the single fluid channel having an integrally formed wall and having a wall thickness, the single fluid channel integrated with the substantially planar thermal-interaction facesheet as a single extruded material, at least some of the material separating the surrounding environment and the single fluid channel by at least the sheet thickness and the wall thickness;
c) wherein the substantially planar thermal-interaction facesheet comprises two or more weldable peripheral edges, the substantially planar thermal-interaction facesheet structured and arranged to remain substantially planar in response to being fixedly joined to at least one other thermal-transfer module using at least one solid-state-welding process; and
d) wherein the single fluid channel extends longitudinally from one end of the substantially planar thermal-interaction facesheet to another end and is about equidistant from each of the weldable peripheral edges.

26. A radiator system comprising:
a) a thermal-transfer assembly structured and arranged to assist thermal transfer between a heat-transfer fluid and a surrounding environment;
b) wherein thermal-transfer assembly comprises
   i) a plurality of thermal-interaction facesheets structured and arranged to thermally interact with the surrounding environment, each of the thermal-interaction facesheets having a sheet thickness of about equal to or less than about 0.04 inches; and
   ii) a plurality of fluid channels each in thermal interaction with each of the thermal-interaction facesheets and each structured and arranged to channel the heat-transfer fluid within the thermal-transfer module, each fluid channel having an integrally formed wall and having a wall thickness, each fluid channel integrated with each of the thermal-interaction facesheets as a single extruded material, at least some of the material separating the surrounding environment and the fluid channel by at least the sheet thickness and the wall thickness;
c) wherein the plurality of thermal-interaction facesheets are joined by friction-stir welds.

* * * * *